(12) United States Patent
Minami et al.

(10) Patent No.: US 11,073,435 B2
(45) Date of Patent: Jul. 27, 2021

(54) THREE-DIMENSIONAL GRIP DETECTION SENSOR

(71) Applicant: Murata Manufacturing Co., Ltd., Nagaokakyo (JP)

(72) Inventors: Kazuaki Minami, Nagaokakyo (JP); Shiori Nagamori, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 16/722,518

(22) Filed: Dec. 20, 2019

(65) Prior Publication Data
US 2020/0132562 A1 Apr. 30, 2020

Related U.S. Application Data

(63) Continuation of application No. PCT/JP2018/026666, filed on Jul. 17, 2018.

(30) Foreign Application Priority Data

Jul. 19, 2017 (JP) .............................. JP2017-139597

(51) Int. Cl.
*G06F 3/041* (2006.01)
*G01L 1/16* (2006.01)
*G06F 3/0346* (2013.01)

(52) U.S. Cl.
CPC .............. *G01L 1/16* (2013.01); *G06F 3/0346* (2013.01); *G06F 3/0414* (2013.01)

(58) Field of Classification Search
CPC ........ G06F 3/0414; G06F 3/041; G06F 3/044; G06F 3/033; G06F 3/0346; G06F 3/0354
See application file for complete search history.

(56) References Cited

U.S. PATENT DOCUMENTS 8,896,523 B2 * 11/2014 Tsukahara ............. G06F 3/0484
345/156
9,720,533 B2 * 8/2017 Ando ...................... G06F 3/041
(Continued)

FOREIGN PATENT DOCUMENTS

| JP | 10619618 A | 1/1994 |
|---|---|---|
| JP | 2005339088 A | 12/2005 |
| WO | 2013122070 A1 | 8/2013 |

OTHER PUBLICATIONS

International Search Report issued for PCT/JP2018/026666 dated Aug. 21, 2018.
(Continued)

*Primary Examiner* — Vijay Shankar
(74) *Attorney, Agent, or Firm* — Arent Fox LLP (57) ABSTRACT

A three-dimensional grip detection sensor is provided that includes an outer wall. When a first region in the outer wall receives pressing operation, it undergoes first deformation recessed inward from the outer wall, and a second region undergoes second deformation opposite to first deformation and that projects outward from the outer wall. The three-dimensional grip detection sensor further includes a three-dimensional object that receives pressing operation, with a first sensor disposed on an outer wall and a second sensor disposed at a position asymmetric to the first sensor. Each of the first and second sensors includes a piezoelectric film deformed by the pressing operation, first and second electrodes on a first main surface of the piezoelectric film and disposed in parallel with the first electrode, and a reference electrode on a second main surface of the piezoelectric film.

20 Claims, 8 Drawing Sheets

(56) References Cited

U.S. PATENT DOCUMENTS

| | | | | |
|---|---|---|---|---|
| 10,031,593 B2* | 7/2018 | Albano | ............... | G06F 3/046 |
| 10,345,960 B2* | 7/2019 | Hardie-Bick | ............ | H04B 1/02 |
| 10,768,718 B2* | 9/2020 | Hardie-Bick | ......... | G06F 3/0346 |
| 2014/0347304 A1 | 11/2014 | Ando | | |
| 2018/0224945 A1* | 8/2018 | Hardie-Bick | ........... | G06F 3/011 |

OTHER PUBLICATIONS

Written Opinion of the International Searching Authority issued for PCT/JP2018/026666 dated Aug. 21, 2018.

* cited by examiner

THREE-DIMENSIONAL GRIP DETECTION SENSOR

CROSS REFERENCE TO RELATED APPLICATIONS

The present application is a continuation of PCT/JP2018/026666 filed Jul. 17, 2018, which claims priority to Japanese Patent Application No. 2017-139597, filed Jul. 19, 2017, the entire contents of each of which are incorporated herein by reference.

TECHNICAL FIELD

The present invention relates to a three-dimensional grip detection sensor that detects a position gripped by the user on an object having a three-dimensional shape.

BACKGROUND

Patent Document 1 (identified below) discloses an input device having a position sensor that detects a position in three-dimensional space or a displacement amount, and a pressure sensor that detects a pressure generated according to a grasping movement of a hand. The input device described in Patent Document 1 has a shape that allows the input device to be grasped by a hand of a user, for example. Thus, it is possible to improve daily usability in inputting a hand movement.

Patent Document 1: Japanese Patent Application Laid-Open No. 6-19618.

In the input device described in Patent Document 1, a plurality of types of sensors are incorporated in order to detect a movement of the user's hand. Such an input device requires a plurality of types of sensors to be disposed in more detail in order to detect a grasping position of a hand in detail, and is a complicated device. Further, even if a plurality of types of sensors are disposed in detail, there is a need for such an input that can more accurately detect a grasping position of a hand.

SUMMARY OF THE INVENTION

In view of the above, an object of an exemplary embodiment of the present invention is to provide a three-dimensional grip detection sensor that can detect a grasping position of a user with a simple structure.

According to an exemplary embodiment, a three-dimensional grip detection sensor is provided that includes an outer wall. When a first region in the outer wall receives pressing operation, the first region undergoes first deformation in which the first region is recessed inward from the outer wall, and a second region different from the first region undergoes second deformation opposite to the first deformation, the second deformation in which the second region projects outward from the outer wall. Further, the exemplary three-dimensional grip detection sensor also includes an object having a three-dimensional shape that receives pressing operation from a user, a first sensor disposed on an outer wall of the object, and a second sensor disposed at a position asymmetric with the first sensor on the outer wall of the object. Each of the first sensor and the second sensor includes a piezoelectric film deformed by pressing operation from the user, a first electrode formed on a first main surface of the piezoelectric film, a second electrode formed on the first main surface of the piezoelectric film and disposed in parallel with the first electrode, and a reference electrode formed on a second main surface of the piezoelectric film.

In this configuration, when the user grips the object having a three-dimensional shape, the first region receiving the pressing operation undergoes the first deformation, in which the first region is deformed inward. At the same time, the second region different from the first region of the object undergoes the second deformation opposite to the first deformation, the second deformation in which the second region projects outward from the outer wall. Further, the first sensor disposed on the outer wall of the object and the second sensor disposed at a position asymmetric with the first sensor are deformed along with the deformation of the object. Thus, each of the first sensor and the second sensor undergoes deformation according to a position where the pressing operation is received. Moreover, the first sensor and the second sensor output a voltage corresponding to the respective deformations. In this manner, the position where the pressing operation is received can be determined based on a voltage detected from each of the first sensor and the second sensor.

DETAILED DESCRIPTION

Figure 1A:
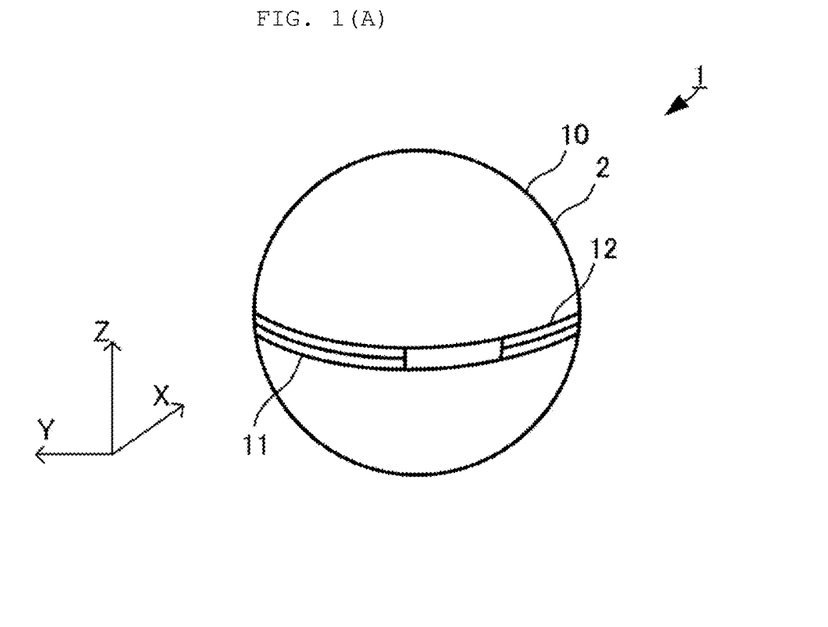
FIG. 1(A) is a perspective view of a three-dimensional grip detection sensor according to a first exemplary embodiment.
Figure 1B:
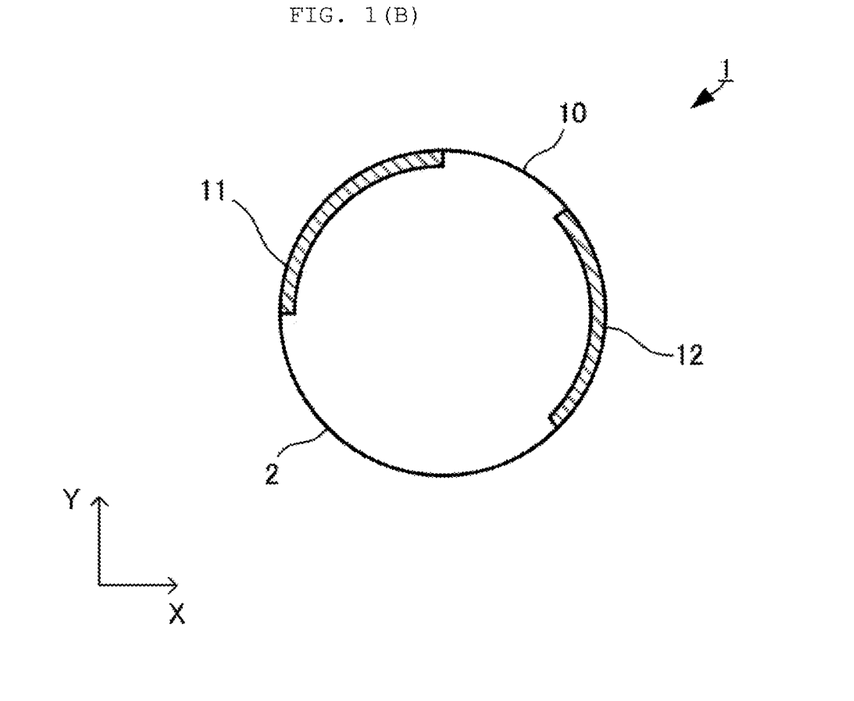
FIG. 1(B) is a cross-sectional view on an X-Y plane of the three-dimensional grip detection sensor.

FIG. 1(A) is a perspective view of a three-dimensional grip detection sensor according to a first exemplary embodiment, and FIG. 1(B) is a cross-sectional view on an X-Y plane of the three-dimensional grip detection sensor. It is noted that FIG. 1(A) is shown in a state where an outer wall is transparent for convenience of explanation. Moreover, in FIGS. 1(A) and 1(B), it is assumed that a width direction (lateral direction) of a housing 10 is an X direction, a length direction (vertical direction) is a Y direction, and a thickness direction is a Z direction. It is also noted that the three-dimensional grip detection sensor illustrated in FIGS. 1(A) and 1(B) is merely an example, and the present invention is not limited to this, and can be changed as appropriate according to specifications.

As shown in FIGS. 1(A) and 1(B), a three-dimensional grip detection sensor 1 includes a housing 10, a first sensor 11, and a second sensor 12. The housing 10 has a three-dimensional spherical shape, and receives a pressing operation from the user. The housing 10 functions as an operation surface for performing a touch operation by being held by a hand of the user. The housing 10 corresponds to an example of an "object" according to the present disclosure. Moreover, it is noted that the housing 10 is not limited to a spherical shape as long as the housing 10 has a three-dimensional shape, and may be a hemispherical shape, a cubic shape, a triangular pyramid, or the like.

As shown, the housing 10 has an outer wall 2. In a first embodiment, the outer wall 2 is the housing 10. In the three-dimensional grip detection sensor 1, the inside of the outer wall 2 is a cavity. Note that, in the three-dimensional grip detection sensor 1, the inside of the outer wall 2 may be filled with a material that expands and contracts together with the outer wall 2.

The first sensor 11 is disposed on an inner side of the housing 10 on the outer wall 2. The second sensor 12 is disposed at a position asymmetric with the first sensor 11 at a different position on the same circumference on the outer wall 2. In this manner, even in a case where the sensor is deformed from any direction on the same circumference, each sensor deforms asymmetrically. Therefore, the first sensor 11 and the second sensor 12 can always detect different deformations for each direction of deformation.

Further, the first sensor 11 and the second sensor 12 are preferably disposed on a maximum circumference of the housing 10 on the same circumference of the outer wall 2. In this manner, for example, deformation in a Z-axis direction in FIG. 1(A) can be detected evenly across the first sensor 11 and the second sensor 12.

The first sensor 11 and the second sensor 12 are disposed at positions on an inner side of the housing 10 on the outer wall 2. However, the configuration is not limited to the above, and the first sensor 11 and the second sensor 12 may be disposed on an outer side of the housing 10. When disposed on an inner side of the housing 10, the first sensor 11 and the second sensor 12 do not receive direct contact from the outside, and have excellent durability. Further, when the first sensor 11 and the second sensor 12 are disposed on the outer side of the housing 10, positions of the first sensor 11 and the second sensor 12 can be easily changed.

Figure 2A:
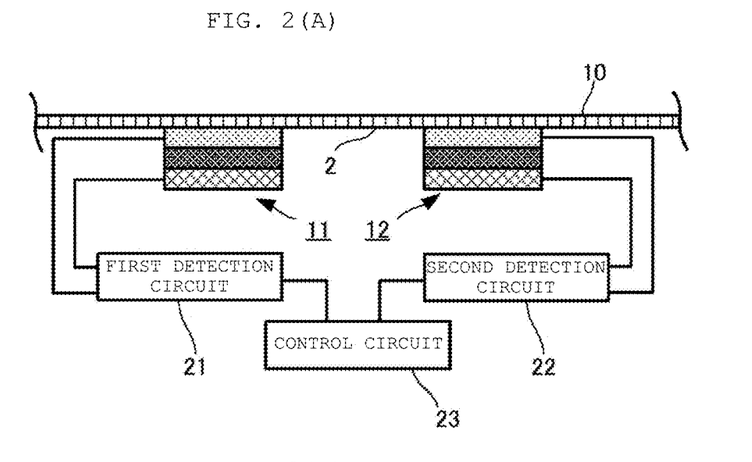
FIG. 2(A) is a schematic diagram for explaining a configuration of the three-dimensional grip detection sensor according to the first exemplary embodiment.
Figure 2B:
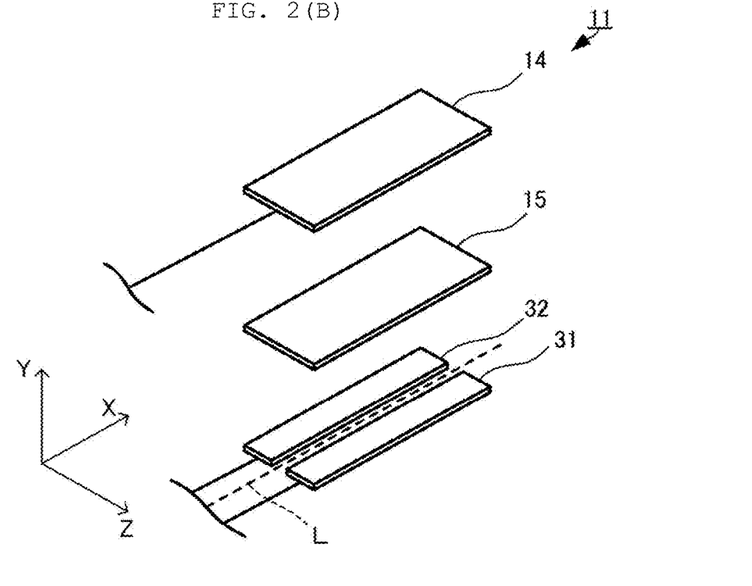
FIG. 2(B) is an exploded perspective view of a first sensor according to the first exemplary embodiment.
Figure 2C:
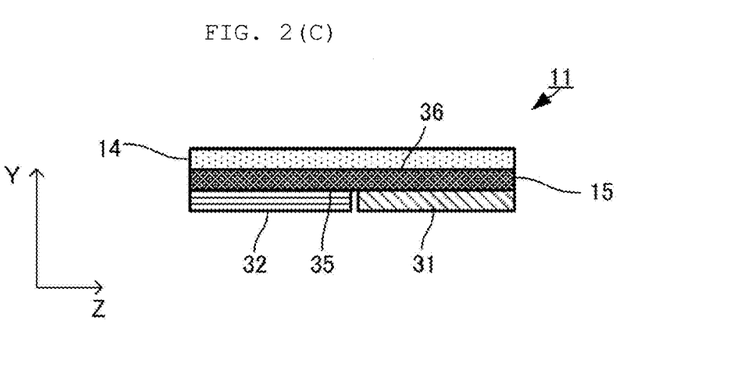
FIG. 2(C) is a cross-sectional view on a Y-Z plane of the first sensor according to the first exemplary embodiment.

FIG. 2(A) is a schematic diagram for explaining a configuration of the three-dimensional grip detection sensor according to the first embodiment, FIG. 2(B) is an exploded perspective view of a first sensor according to the first embodiment, and FIG. 2(C) is a cross-sectional view on a Y-Z plane of the first sensor according to the first embodiment. In FIG. 2(B) and FIG. 2(C), a length direction (vertical direction) of the first sensor is described as an X direction, a width direction (lateral direction) is described as a Z direction, and a thickness direction is described as a Y direction.

As shown in FIG. 2(A), the three-dimensional grip detection sensor 1 includes the first sensor 11, the second sensor 12, a first detection circuit 21, a second detection circuit 22, and a control circuit 23. The first sensor 11 is connected to the first detection circuit 21, and the second sensor 12 is connected to the second detection circuit 22. Both the first detection circuit 21 and the second detection circuit 22 are connected to the control circuit 23.

The generated potentials in the first sensor 11 or the second sensor 12 are detected by the first detection circuit 21 or the second detection circuit 22, respectively. The control circuit 23 determines the generated potential detected by the first detection circuit 21 or the second detection circuit 22 in a determination unit (not shown). The generated potential detected by the first detection circuit 21 or the second detection circuit 22 and the determination will be described in detail in detail below.

Hereinafter, the first sensor 11 will be described with reference to FIGS. 2(B) and 2(C). Note that the second sensor 12 has a structure similar to that of the first sensor 11, and a description thereof will be omitted.

The first sensor 11 includes a reference electrode 14, a piezoelectric film 15, a first electrode 31, and a second electrode 32. The first electrode 31 and the second electrode 32 are formed on a first main surface 35 of the piezoelectric film 15. The reference electrode 14 is formed on a second main surface 36 of the piezoelectric film 15 that is opposite the first main surface 35. That is, the reference electrode 14, the piezoelectric film 15, the first electrode 31, and the second electrode 32 are stacked in a state where the piezoelectric film 15 is sandwiched. Note that, in the first sensor 11, a ratio of the lengths in the X direction and the Z direction can be changed as appropriate according to a use situation. Further, the reference electrode 14, the piezoelectric film 15, the first electrode 31, and the second electrode 32 preferably have a flat film shape. In this manner, the first sensor 11 can be easily deformed with the deformation of the housing 10.

The second electrode 32 is disposed in parallel with the first electrode 31. For example, as shown in FIG. 2(B), the first electrode 31 and the second electrode 32 are arranged in parallel with a center line L sandwiched therebetween. Conducting wires extend from the first electrode 31 and the second electrode 32, and the conducting wires extending from the first electrode 31 and the second electrode 32 are connected to the first detection circuit 21. In this manner, the potential between the first electrode 31 and the reference electrode 14 and the potential between the second electrode 32 and the reference electrode 14 are individually obtained.

When the first sensor 11 is viewed in a plan view, at least one of the first electrode 31 and the second electrode 32 or the reference electrode 14 is preferably completely overlapped with the piezoelectric film 15 in a top view or is preferably positioned inward of the piezoelectric film 15 in a plane direction. In this manner, a short circuit at an edge portion of an electrode can be suppressed. In FIG. 2(B) and FIG. 2(C), the reference electrode 14 is represented as a solid electrode. However, the configuration may be such that a reference electrode is provided for each of the first electrode 31 or the second electrode 32, and is connected by a wiring electrode (not shown).

Figure 3:
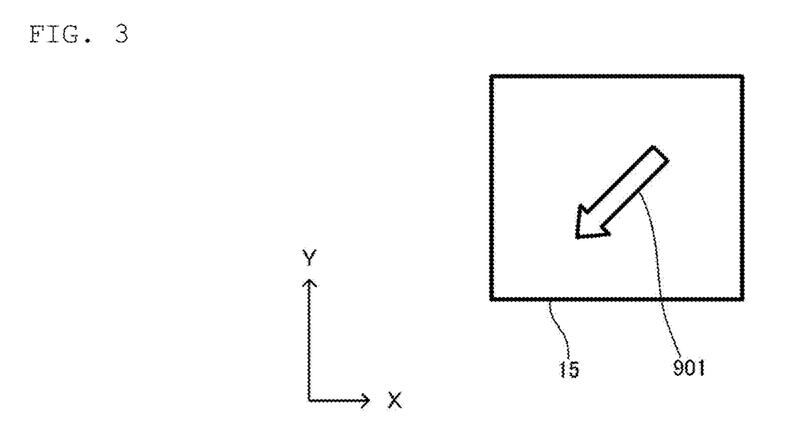
FIG. 3 is a diagram for explaining a piezoelectric film according to the first exemplary embodiment.

FIG. 3 is a diagram for explaining a piezoelectric film according to the first exemplary embodiment.

As shown in FIG. 3, the piezoelectric film 15 may be a film formed from a chiral polymer. As the chiral polymer, polylactic acid (PLA), particularly poly-L-lactic acid (PLLA), is used in the first embodiment. In PLLA formed from a chiral polymer, a main chain has a helical structure. PLLA has piezoelectricity when uniaxially stretched and a molecule is oriented. Then, the uniaxially stretched PLLA generates potential when a flat plate surface of the piezoelectric film 15 is pressed. At this time, a generated potential amount depends on a displacement amount by which the flat plate surface is displaced in a direction orthogonal to the flat plate surface by a pressing amount.

In the first exemplary embodiment, a uniaxially stretching direction of the piezoelectric film 15 (PLLA) is a direction that forms an angle of 45 degrees in opposite directions with respect to the X direction and the Y direction as shown by an arrow 901 in FIG. 3. This angle of 45 degrees includes, for example, an angle of about 45±10 degrees.

In PLLA, piezoelectricity is generated by orientation treatment of molecules by stretching or the like, and there is no need to perform polarization treatment like other polymers such as PVDF and piezoelectric ceramics. That is, piezoelectricity of PLLA not belonging to a ferroelectric is not expressed by polarization of an ion like a ferroelectric, such as PVDF or PZT, but is derived from a helical structure which is a characteristic structure of a molecule. Thus, PLLA does not have pyroelectricity that is generated in other ferroelectric piezoelectric materials The first sensor 11, which does not have pyroelectricity and is not affected by a temperature of a finger of the user or frictional heat, can be formed to be thin. Furthermore, a change in a piezoelectric constant is observed over time in PVDF or the like, and in some cases, a piezoelectric constant may decrease significantly; however, a piezoelectric constant of PLLA is extremely stable over time. Therefore, it is possible to detect a displacement caused by pressing with high sensitivity without being affected by a surrounding environment.

An electrode based on metal, such as aluminum and copper, is preferably used for the first electrode 31, the second electrode 32, or the reference electrode 14 formed on both main surfaces of the piezoelectric film 15. By providing the first electrode 31, the second electrode 32, and the reference electrode 14 described above, charges generated by the piezoelectric film 15 can be acquired as a potential difference, and a pressing amount detection signal of a voltage value corresponding to a pressing amount, that is, deformation, can be output to the outside.

According to an exemplary aspect, the piezoelectric film 15 is preferably formed integrally in the first sensor 11 and the second sensor 12. That is, both the first sensor 11 and the second sensor 12 are formed so as not to overlap part of the piezoelectric film 15. In this manner, only one of the piezoelectric film 15 is required, and therefore, the attaching process and the like are simplified.

It is also noted that, although the piezoelectric film 15 is used in the first sensor 11, the piezoelectric film 15 may be configured for each of the first electrode 31 or the second electrode 32. In this manner, deformation of the first electrode 31 side or the second electrode 32 side is transmitted to the piezoelectric film for each of the electrodes, so that the generated potential can be further clearly detected for each of the first electrode 31 or the second electrode 32.

Hereinafter, the deformation and generated potential of the three-dimensional grip detection sensor according to the present embodiment and a comparative example will be described. First, there will be described a case where the circumference, on which the first sensor 11 and the second sensor 12 exist in the three-dimensional grip detection sensor 1, is pressed.

Figure 4A:
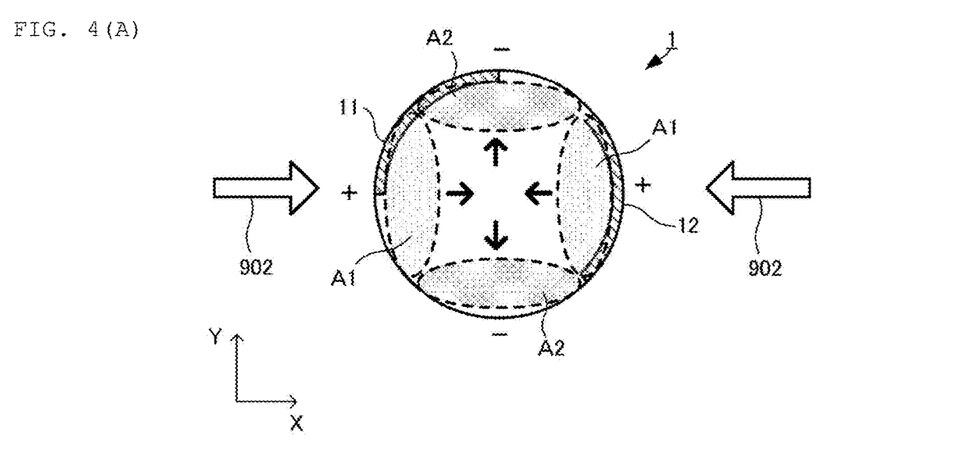
FIG. 4(A) is a diagram for explaining deformation of the three-dimensional grip detection sensor according to the first exemplary embodiment.
Figure 4B:
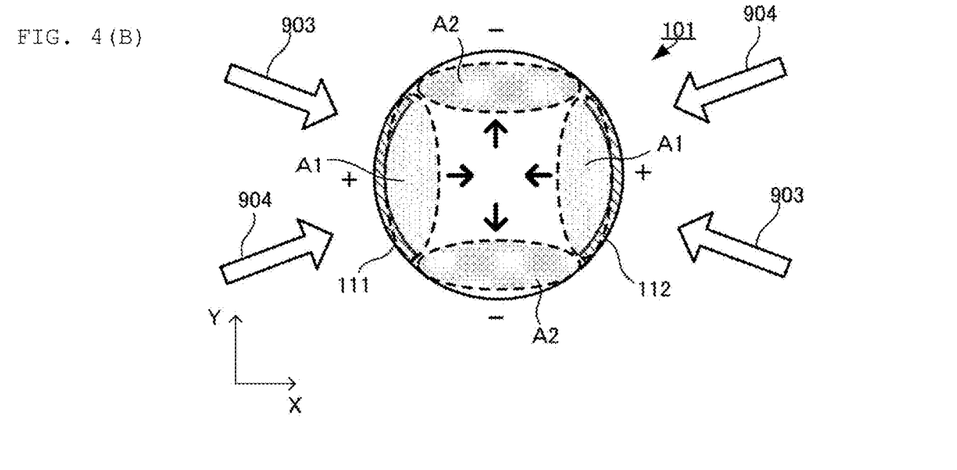
FIG. 4(B) is a diagram for explaining deformation of the three-dimensional grip detection sensor according to a comparative example.

FIG. 4(A) is a diagram for explaining deformation of the three-dimensional grip detection sensor according to the first exemplary embodiment. FIG. 4(A) is a cross-sectional view on the X-Y plane of the three-dimensional grip detection sensor 1 like FIG. 1(B). FIG. 4(B) is a diagram for explaining deformation of the three-dimensional grip detection sensor according to the comparative example. FIG. 4(B) is a cross-sectional view on the X-Y plane of a three-dimensional grip detection sensor 101.

As shown in FIG. 4(A), there will be described a case where the three-dimensional grip detection sensor 1 is gripped on the circumference where the first sensor 11 and the second sensor 12 exist in directions indicated by a pair of arrows 902. For example, fingers of the user apply a force to the three-dimensional grip detection sensor 1 at a so-called 3-o'clock position and a 9-o'clock position shown in FIG. 4(A). In this manner, in a first region A1 at the 3-o'clock position and the 9-o'clock position, the outer wall 2 undergoes first deformation in which the outer wall 2 is recessed inward. At the same time, in a second region A2 different from the first region A1, that is, at a so-called 12-o'clock position and a 6-o'clock position on the X-Y plane shown in FIG. 4(A), the outer wall 2 undergoes second deformation in which the outer wall 2 projects outward.

At this time, the first sensor 11 exists over the first region A1 and the second region A2. Thus, the first sensor 11 present in the first region A1 undergoes the first deformation, and the first sensor 11 present in the second region A2 undergoes the second deformation. At the same time, the second sensor 12 exists substantially over the first region A1. Accordingly, substantially the entire second sensor 12 undergoes the first deformation. In this manner, the first sensor 11 and the second sensor 12 are disposed asymmetrically on the outer wall 2 of the three-dimensional grip detection sensor 1, and the first sensor 11 and the second sensor 12 are deformed differently so as to detect different potentials.

In contrast, as shown in FIG. 4(B), in the three-dimensional grip detection sensor 101 according to the comparative example, a first sensor 111 and a second sensor 112 are disposed symmetrically on the outer wall 2 of the three-dimensional grip detection sensor 101. At this time, the first sensor 111 and the second sensor 112 are deformed symmetrically in a case where the three-dimensional grip detection sensor 101 is gripped in directions indicated by a pair of arrows 903 and in a case where the three-dimensional grip detection sensor 101 is gripped in directions indicated by a pair of arrows 904. Therefore, there is no difference between the cases of gripping at the positions of the pair of arrows 903 and the pair of arrows 904.

Figure 5:
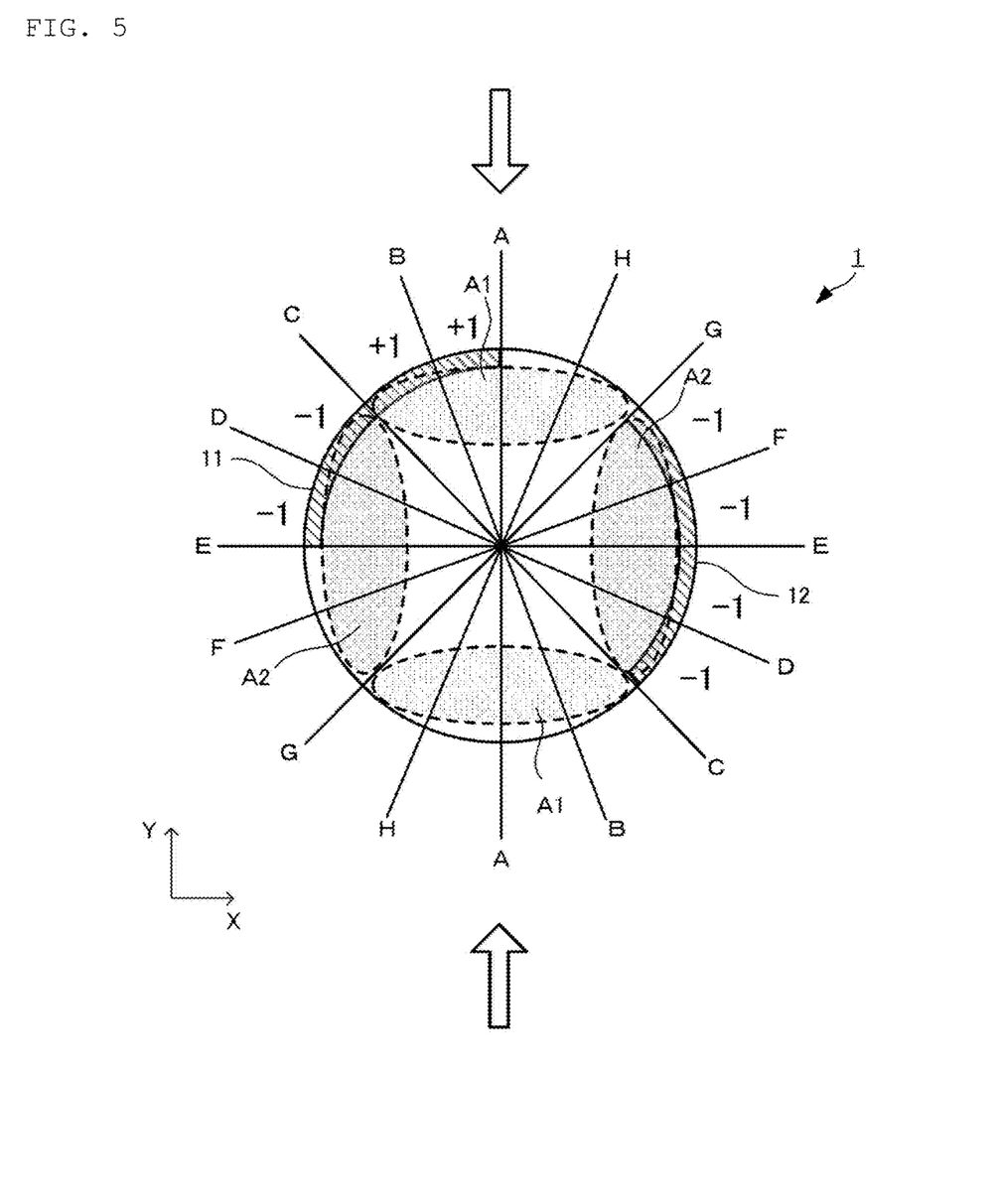
FIG. 5 is a diagram for explaining deformation and generated potential of the three-dimensional grip detection sensor according to the first exemplary embodiment.

Hereinafter, a relationship between a gripping position and the generated potential in the three-dimensional grip detection sensor 1 will be described. FIG. 5 is a diagram for explaining deformation and generated potential of the three-dimensional grip detection sensor according to the first embodiment. It is noted that, in FIG. 5, the gripping position is on the circumference where the first sensor 11 and the second sensor 12 exist, as in FIG. 4(A).

As shown in FIG. 5, the generated potential in a case where the user grips the three-dimensional grip detection sensor 1 at a position in an A-A direction on the X-Y plane will be described. Fingers of the user apply a force to the three-dimensional grip detection sensor 1 at positions in the A-A direction shown in FIG. 5.

In this manner, in the first region A1 around the position in the A-A direction, the outer wall 2 undergoes the first deformation in which the outer wall 2 is recessed inward. At the same time, in the second region A2 different from the first region A1, that is, at a position in an E-E direction on the X-Y plane shown in FIG. 5, the outer wall 2 undergoes the second deformation in which the outer wall 2 projects outward.

At this time, the first sensor 11 exists over the first region A1 and the second region A2. Thus, the first sensor 11 present in the first region A1 undergoes the first deformation, and the first sensor 11 present in the second region A2 undergoes the second deformation. At the same time, the second sensor 12 exists substantially over the first region A1. Accordingly, substantially the entire second sensor 12 undergoes the first deformation.

Here, it is assumed that the first sensor 11 and the second sensor 12 generate a positive charge in the first deformation, and generate a negative charge in the second deformation. Further, in the case of the three-dimensional grip detection sensor 1 shown in FIG. 5, it is assumed that a potential of +1 V is generated when the first deformation is made in a predetermined range, for example, in a range from A to B directions.

Since the first sensor 11 undergoes the first deformation in a range from A to C directions, the potential of +2 V is generated in the range from A to C directions. Further, since the first sensor 11 undergoes the second deformation in a range from C to E directions, the potential of −2 V is generated in the range from C to E directions. In this manner, the generated potential of the first sensor 11 is 0 V, which is the sum of +2 V and −2 V.

Since the second sensor 12 undergoes the second deformation in an entire range from G to C directions, the potential of −4 V is generated in the range from G to C directions. In this manner, the generated potential of the second sensor 12 is −4 V.

TABLE 1

| Gripping position | A-A | B-B | C-C | D-D | E-E | F-F | G-G | H-H |
|---|---|---|---|---|---|---|---|---|
| First sensor | 0 | 2 | 4 | 2 | 0 | −2 | −4 | −2 |
| Second sensor | −4 | −2 | 0 | 2 | 4 | 2 | 0 | −2 |

Table 1 shows a relationship between a position in a case where the user grips the circumference where the first sensor 11 and the second sensor 12 of the three-dimensional grip detection sensor 1 exist, and the generated potential of each of the first sensor 11 and the second sensor 12.

As shown in Table 1, the generated potentials of the first sensor 11 and the second sensor 12 differ depending on the position at which the user grips the three-dimensional grip detection sensor 1. Thus, a position at which the user grips the three-dimensional grip detection sensor 1 can be detected.

Figure 6:
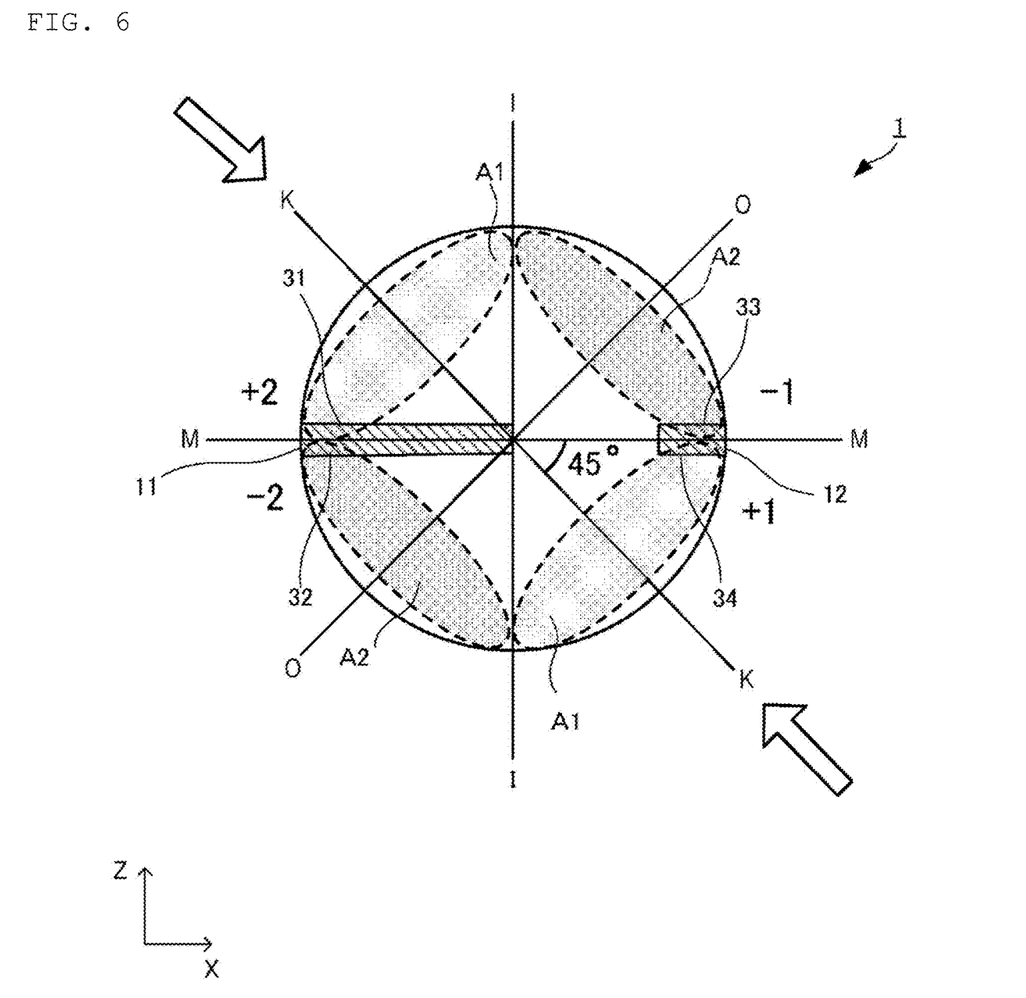
FIG. 6 is a diagram for explaining deformation and generated potential of the three-dimensional grip detection sensor according to the first exemplary embodiment.
Figure 7:
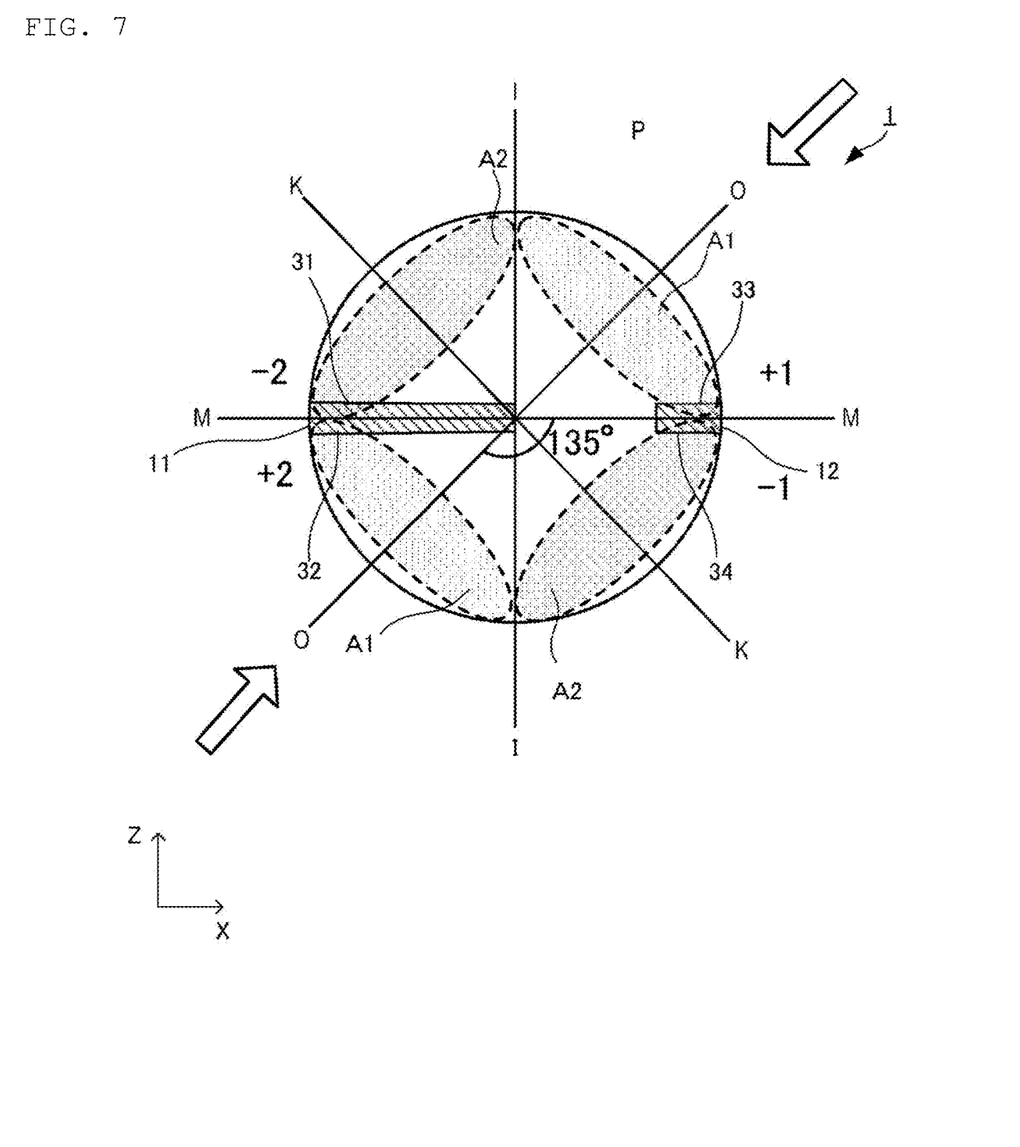
FIG. 7 is a diagram for explaining deformation and generated potential of the three-dimensional grip detection sensor according to the first exemplary embodiment.
Figure 8:
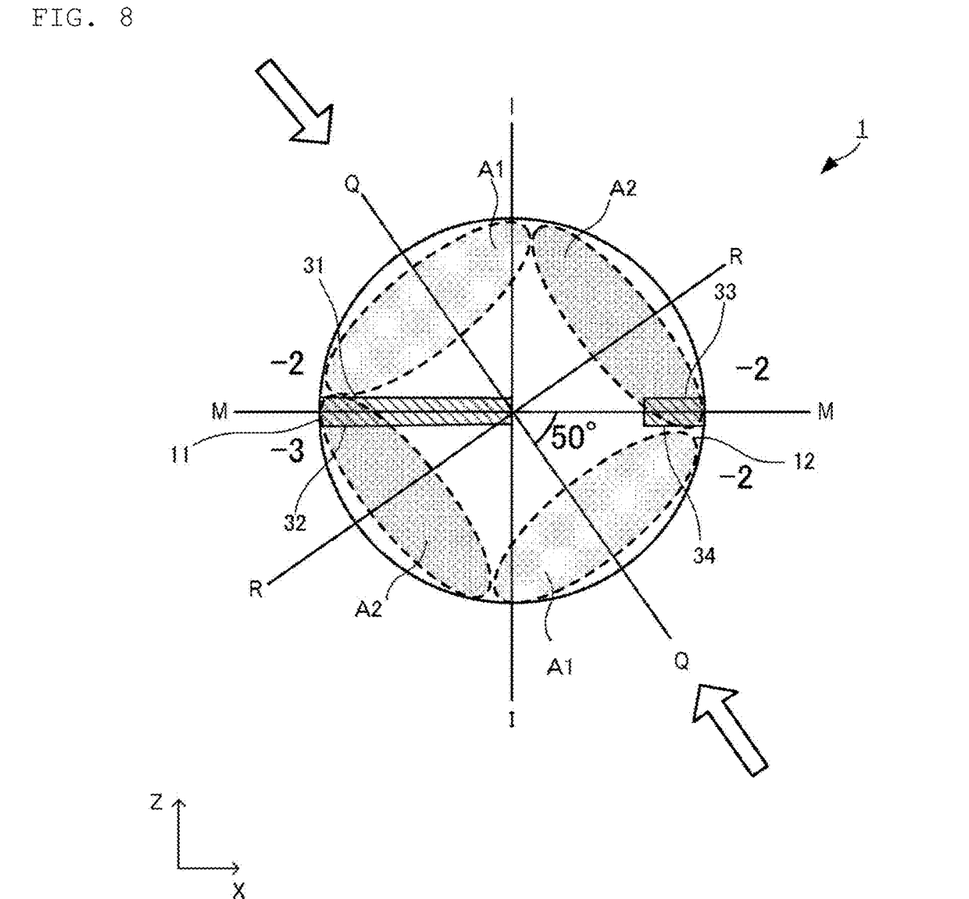
FIG. 8 is a diagram for explaining deformation and generated potential of the three-dimensional grip detection sensor according to the first exemplary embodiment.

FIGS. 6, 7, and 8 are diagrams for explaining deformation and generated potential of the three-dimensional grip detection sensor according to the first exemplary embodiment. Note that, in FIGS. 6, 7, and 8, the gripping position is a position on the circumference along an X-Z plane perpendicular to the X-Y plane.

As shown in FIG. 6, the generated potential in a case where the user grips the three-dimensional grip detection sensor 1 at a position in a K-K direction on the X-Z plane will be described. The K-K direction is at a position at an angle of 45° with respect to an I-I direction and an M-M direction.

Fingers of the user apply a force to the three-dimensional grip detection sensor 1 at positions in the K-K direction shown in FIG. 6. In this manner, in the first region A1 around the position in the K-K direction, the outer wall 2 undergoes the first deformation in which the outer wall 2 is recessed inward. At the same time, in the second region A2 different from the first region A1, that is, at a position in an O-O direction on the X-Z plane shown in FIG. 6, the outer wall 2 undergoes the second deformation in which the outer wall 2 projects outward.

At this time, part of the first sensor 11 on the first electrode 31 side undergoes the first deformation. Moreover, part of the first sensor 11 on the second electrode 32 side undergoes the second deformation.

At this time, the first electrode 31 in the first sensor 11 is deformed in a substantially similar range to the second electrode 32 in the first sensor 11.

Since part of the first sensor 11 on the first electrode 31 side undergoes the first deformation, the potential of +2 V is generated. Further, since part of the first sensor 11 on the second electrode 32 side undergoes the second deformation, the potential of −2 V is generated. In this manner, the generated potential of the first sensor 11 is different between the first electrode 31 and the second electrode 32.

Part of the second sensor 12 on a first electrode 33 side undergoes the second deformation. Part of the second sensor 12 on a second electrode 34 side undergoes the first deformation. At this time, the first electrode 33 in the second sensor 12 is deformed in a substantially similar range to the second electrode 34 in the second sensor 12.

Since part of the second sensor 12 on the first electrode 33 side undergoes the second deformation, the potential of −1 V is generated. Further, since part of the second sensor 12 on the second electrode 34 side undergoes the first deformation, the potential of +1 V is generated. In this manner, the generated potential of the second sensor 12 is different between the first electrode 33 and the second electrode 34.

As shown in FIG. 7, the generated potential in a case where the user grips the three-dimensional grip detection sensor 1 at a position in the O-O direction on the X-Z plane will be described. The O-O direction is at a position at an angle of 135° with respect to the I-I direction and the M-M direction, and at a position at an angle of 90° from the K-K direction.

According to this example, it is understood that fingers of the user apply a force to the three-dimensional grip detection sensor 1 at positions in the O-O direction shown in FIG. 7. In this manner, in the first region A1 around the position in the O-O direction, the outer wall 2 undergoes the first deformation in which the outer wall 2 is recessed inward. At the same time, in the second region A2 different from the first region A1, that is, at a position in the K-K direction on the X-Z plane shown in FIG. 7, the outer wall 2 undergoes the second deformation in which the outer wall 2 projects outward.

At this time, part of the first sensor 11 on the first electrode 31 side undergoes the second deformation. Part of the first sensor 11 on the second electrode 32 side undergoes the first deformation.

Moreover, at this time, the first electrode 31 in the first sensor 11 is deformed in a substantially similar range to the second electrode 32 in the first sensor 11.

Since part of the first sensor 11 on the first electrode 31 side undergoes the second deformation, the potential of −2

V is generated. Further, since part of the first sensor 11 on the second electrode 32 side undergoes the first deformation, the potential of +2 V is generated. In this manner, the generated potential of the first sensor 11 is different between the first electrode 31 and the second electrode 32.

Part of the second sensor 12 on the first electrode 33 side undergoes the first deformation. Part of the second sensor 12 on the second electrode 34 side undergoes the second deformation. At this time, the first electrode 33 in the second sensor 12 is deformed in a substantially similar range to the second electrode 34 in the second sensor 12.

Since part of the second sensor 12 on the first electrode 33 side undergoes the first deformation, the potential of +1 V is generated. Further, since part of the second sensor 12 on the second electrode 34 side undergoes the second deformation, the potential of −1 V is generated.

As shown in FIG. 8, the generated potential in a case where the user grips the three-dimensional grip detection sensor 1 at a position in a Q-Q direction on the X-Z plane will be described. The Q-Q direction is at a position at an angle of 40° with respect to the I-I direction and at an angle of 50° with respect to the M-M direction. According to this example, fingers of the user apply a force to the three-dimensional grip detection sensor 1 at positions in the Q-Q direction shown in FIG. 8.

In this manner, in the first region A1 around the position in the Q-Q direction, the outer wall 2 undergoes the first deformation in which the outer wall 2 is recessed inward. At the same time, in the second region A2 different from the first region A1, that is, at a position in an R-R direction on the X-Z plane shown in FIG. 8, the outer wall 2 undergoes the second deformation in which the outer wall 2 projects outward.

At this time, part of the first sensor 11 on the first electrode 31 side undergoes the second deformation. Part of the first sensor 11 on the second electrode 32 side undergoes the second deformation.

At this time, a range in which the first electrode 31 in the first sensor 11 is deformed is small as compared with the second electrode 32 in the first sensor 11.

Since part of the first sensor 11 on the first electrode 31 side undergoes the second deformation, the potential of −2 V is generated. Further, since part of the first sensor 11 on the second electrode 32 side undergoes the second deformation, the potential of −3 V is generated.

Part of the second sensor 12 on the first electrode 33 side undergoes the second deformation. Part of the second sensor 12 on the second electrode 34 side undergoes the second deformation. At this time, the first electrode 33 in the second sensor 12 is deformed in a substantially similar range to the second electrode 34 in the second sensor 12.

Since part of the second sensor 12 on the first electrode 33 side undergoes the second deformation, the potential of −2 V is generated. Further, since part of the second sensor 12 on the second electrode 34 side undergoes the second deformation, the potential of −2 V is generated.

TABLE 2

| Gripping position | | 45° | 50° | 135° |
|---|---|---|---|---|
| First sensor | First electrode | 2 | −2 | −2 |
| | Second electrode | −2 | −3 | 2 |
| Second sensor | First electrode | −1 | −2 | 1 |
| | Second electrode | 1 | −2 | −1 |

Table 2 shows a relationship between a position in a case where the user grips the circumference where the first sensor 11 and the second sensor 12 of the three-dimensional grip detection sensor 1 exist, and the generated potential of each of the first sensor 11 and the second sensor 12.

As shown in Table 2, the generated potentials in the electrodes of the first sensor 11 and the second sensor 12 differ depending on the position at which the user grips the three-dimensional grip detection sensor 1. Thus, a position at which the user grips the three-dimensional grip detection sensor 1 can be detected. That is, the potentials detected by the first electrode 31, the second electrode 32, the first electrode 33, and the second electrode 34 change depending on positions at which the user grips the three-dimensional grip detection sensor 1, so that the gripping position can be detected based on these four potentials. It is noted that, although the case is described where the positions at 45°, 50°, and 135° with respect to the M-M direction are gripped, different potentials are similarly detected at positions at other angles, so that the gripping position can be similarly detected based on four potentials.

Accordingly, the three-dimensional grip detection sensor 1 detects different potentials in all directions depending on the position gripped by the user. Thus, the gripping position can be detected from the generated potential by storing a relationship between each location and the generated potential in advance in the three-dimensional grip detection sensor 1 or the like.

Figure 9:
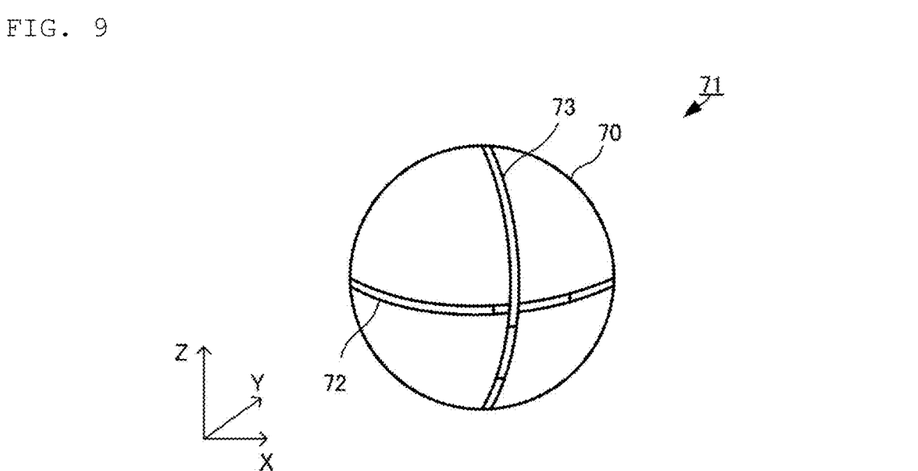
FIG. 9 is a perspective view of the three-dimensional grip detection sensor according to a second exemplary embodiment.

FIG. 9 is a perspective view showing a three-dimensional grip detection sensor according to a second exemplary embodiment. Hereinafter, the three-dimensional grip detection sensor according to the second embodiment will be described, and the description of a configuration similar to that of the first embodiment will be omitted.

As shown in FIG. 9, a three-dimensional grip detection sensor 71 according to the second embodiment is substantially similar to the first embodiment except that a first sensor 72 is disposed at a position orthogonal to a second sensor 73. That is, the first sensor 72 and the second sensor 73 are disposed asymmetrically on an outer wall 70. In this manner, the potential corresponding to a deformed position can be detected from the first sensor 72 and the second sensor 73 depending on a position at which the user grips the three-dimensional grip detection sensor 71. Accordingly, the three-dimensional grip detection sensor 71 can detect the gripping position.

Figure 10A:
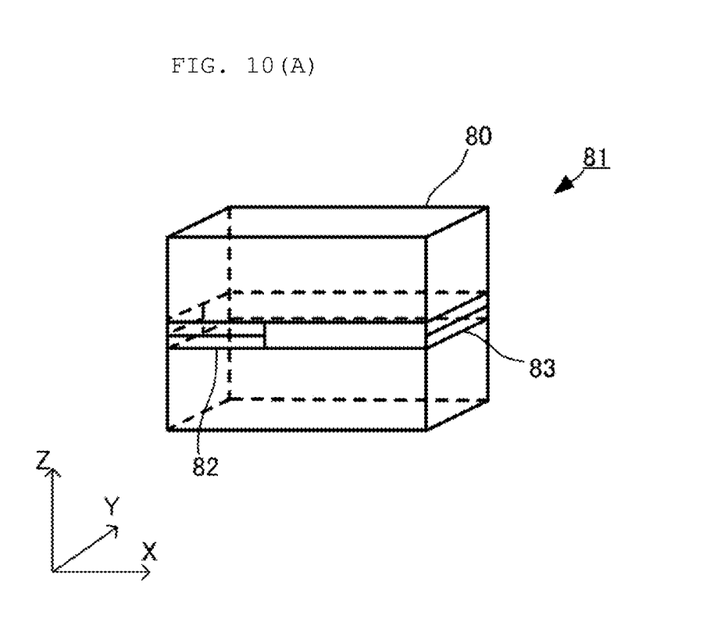
FIG. 10(A) is a perspective view of the three-dimensional grip detection sensor according to a third exemplary embodiment.
Figure 10B:
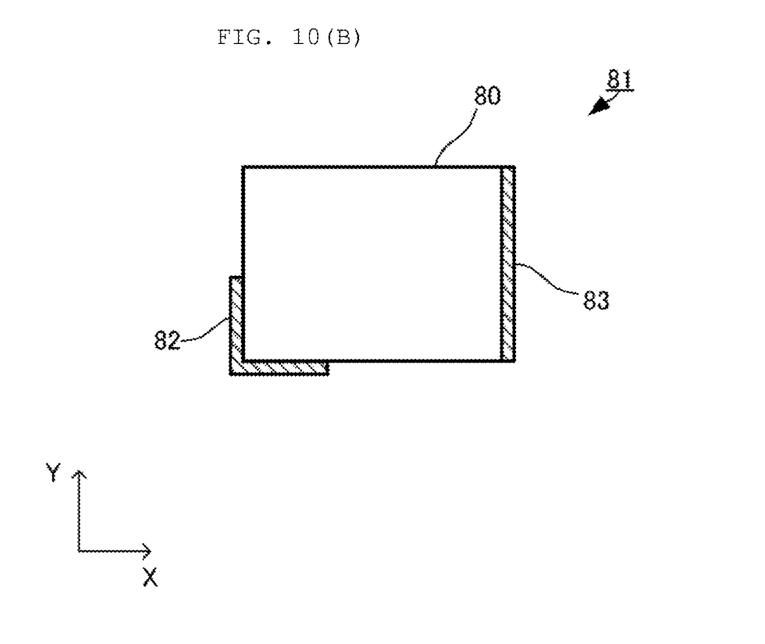
FIG. 10(B) is a cross-sectional view on an X-Y plane of the three-dimensional grip detection sensor.

FIG. 10(A) is a perspective view of the three-dimensional grip detection sensor according to a third exemplary embodiment, and FIG. 10(B) is a cross-sectional view on an X-Y plane of the three-dimensional grip detection sensor. For example, as shown in FIGS. 10(A) and 10(B), a three-dimensional grip detection sensor 81 has a rectangular parallelepiped shape and a rectangular cross section. The three-dimensional grip detection sensor 81 includes a first sensor 82 and a second sensor 83 outside an outer wall 80. The first sensor 82 and the second sensor 83 are disposed asymmetrically in the three-dimensional grip detection sensor 81. In this manner, the three-dimensional grip detection sensor 81 can detect the gripping position.

It is noted that the three-dimensional grip detection sensor is not limited to a spherical shape or a rectangular parallelepiped shape, and only needs to have a three-dimensional shape. The three-dimensional grip detection sensor can be set to a three-dimensional shape, such as a rectangular parallelepiped shape or a cylindrical shape, according to a use state.

It is also noted that, in the three-dimensional grip detection sensor 1, the first sensor 11 and the second sensor 12 are disposed inside the outer wall 2; however, the first sensor 11 and the second sensor 12 may be disposed outside the outer wall 2. As a result, this configuration makes it easy to replace and change positions of the first sensor 11 and the second sensor 12.

It is also noted that, in the three-dimensional grip detection sensor 1, the second sensor 12 has a structure similar to that of the first sensor 11; however, the second sensor 12 may have a shape different from that of the first sensor 11. For example, a width in the Z-axis direction of the second sensor 12 may be longer than that of the first sensor 11. In this manner, the generated voltages of the first sensor 11 and the second sensor 12 are clearly different. Therefore, the gripping position can be detected more clearly.

It is also noted that, in the three-dimensional grip detection sensor 1, the first electrode 31 has a structure similar to the second electrode 32. However, the first electrode 31 may have a shape different from that of the second electrode 32 according to an alternative aspect. For example, a width in the Z-axis direction of the first electrode 31 may be longer than that of the second electrode 32. In this manner, the generated voltages of the first sensor 11 and the second sensor 12 are clearly different. Therefore, the gripping position can be detected more clearly.

Finally, it should be appreciated that the description of the present embodiment is illustrative in all respects and not restrictive. The scope of the present invention is indicated not by the above-described embodiments but by the claims. Furthermore, the scope of the present invention is intended to include all modifications within the meaning and scope equivalent to the scope of the claims.

DESCRIPTION OF REFERENCE SYMBOLS

1, 71, 81: Three-dimensional grip detection sensor
2, 70, 80: Outer wall
10: Housing (object)
11, 72, 82: First sensor
12, 73, 83: Second sensor
14: Reference electrode
15: Piezoelectric film
31: First electrode
32: Second electrode
35: First main surface
36: Second main surface
A1: First region
A2: Second region

The invention claimed is:

1. A three-dimensional grip detection sensor comprising:
an outer wall having first and second regions different from each other, wherein, when the first region receives a pressing operation from a user, the first region undergoes a first deformation such that the first region is recessed inward from the outer wall, and the second region undergoes a second deformation opposite to the first deformation such that the second deformation projects outward from the outer wall;
an object having a three-dimensional shape configured to receive the pressing operation;
a first sensor disposed on an outer wall of the object; and
a second sensor disposed at a position asymmetric to the first sensor on the outer wall of the object;
wherein the three-dimensional grip detection sensor comprises a plurality of sensors including the first and second sensors, with all of the plurality of sensors being disposed asymmetrically with respect to each other, and
wherein each of the first sensor and the second sensor includes:
a piezoelectric film deformed by the pressing operation from the user;
a first electrode disposed on a first main surface of the piezoelectric film;
a second electrode disposed on the first main surface of the piezoelectric film and in parallel with the first electrode; and
a reference electrode disposed on a second main surface of the piezoelectric film that is opposite the first main surface.

2. The three-dimensional grip detection sensor according to claim 1, wherein the object comprises a spherical shape, with the outer wall defining an outer surface of the spherical shape.

3. The three-dimensional grip detection sensor according to claim 2, wherein the first and second sensors are disposed asymmetrically at different positions on a same circumference of the outer wall of the spherically-shaped object.

4. The three-dimensional grip detection sensor according to claim 3, wherein the same circumference is a maximum circumference of the object.

5. The three-dimensional grip detection sensor according to claim 1, wherein the piezoelectric films of the first sensor and the second sensor are integrally formed.

6. The three-dimensional grip detection sensor according to claim 5, wherein the first sensor and the second sensor are formed so as to not overlap a part of the piezoelectric films.

7. The three-dimensional grip detection sensor according to claim 2, wherein the first and second sensors are disposed orthogonally with respect to each other on the outer wall of the object.

8. The three-dimensional grip detection sensor according to claim 1, wherein the first and second sensors are disposed on an inside of the outer wall.

9. The three-dimensional grip detection sensor according to claim 1, wherein the first and second sensors are disposed on an outside of the outer wall.

10. The three-dimensional grip detection sensor according to claim 1, wherein the object comprises a rectangular shape with the first sensor disposed on a side of the rectangular shape and the second sensor disposed on a corner of the rectangular shape.

11. A three-dimensional grip detection sensor comprising:
an object having a three-dimensional shape and an outer wall configured to receive a pressing operation from a user, with the outer wall defining an exterior of the object;
a first sensor disposed on an outer wall of the object; and
a second sensor disposed on the outer wall of the object asymmetrically to the first sensor;
wherein each of the first sensor and the second sensor includes:
a piezoelectric film deformed by the pressing operation from the user;
first and second electrodes disposed on a first main surface of the piezoelectric film and parallel to each other; and
a reference electrode disposed on a second main surface of the piezoelectric film that is opposite the first main surface.

12. The three-dimensional grip detection sensor according to claim 11,
wherein the outer wall of the object has first and second regions different from each other, and
wherein, when the first region receives the pressing operation from the user, the first region undergoes a first deformation such that the first region is recessed inward from the outer wall, and the second region undergoes a second deformation opposite to the first deformation such that the second deformation projects outward from the outer wall.

13. The three-dimensional grip detection sensor according to claim 11, wherein the object comprises a spherical shape.

14. The three-dimensional grip detection sensor according to claim 13, further comprising a plurality of sensors including the first and second sensors, with all of the plurality of sensors being disposed asymmetrically with respect to each other at different positions on a same circumference of the outer wall of the spherically-shaped object.

15. The three-dimensional grip detection sensor according to claim 14, wherein the same circumference is a maximum circumference of the object.

16. The three-dimensional grip detection sensor according to claim 11, wherein the piezoelectric films of the first sensor and the second sensor are integrally formed, such that the first sensor and the second sensor do not overlap a part of the piezoelectric films.

17. The three-dimensional grip detection sensor according to claim 13, wherein the first and second sensors are disposed orthogonally with respect to each other on the outer wall of the object.

18. The three-dimensional grip detection sensor according to claim 11, wherein the first and second sensors are disposed on an inside of the outer wall.

19. The three-dimensional grip detection sensor according to claim 11, wherein the first and second sensors are disposed on an outside of the outer wall.

20. The three-dimensional grip detection sensor according to claim 11, wherein the object comprises a rectangular shape with the first sensor disposed on a side of the rectangular shape and the second sensor disposed on a corner of the rectangular shape.

* * * * *